Jan. 8, 1952     C. E. PARKER     2,581,598
SHEET HANDLING APPARATUS
Filed Dec. 1, 1944     6 Sheets-Sheet 1
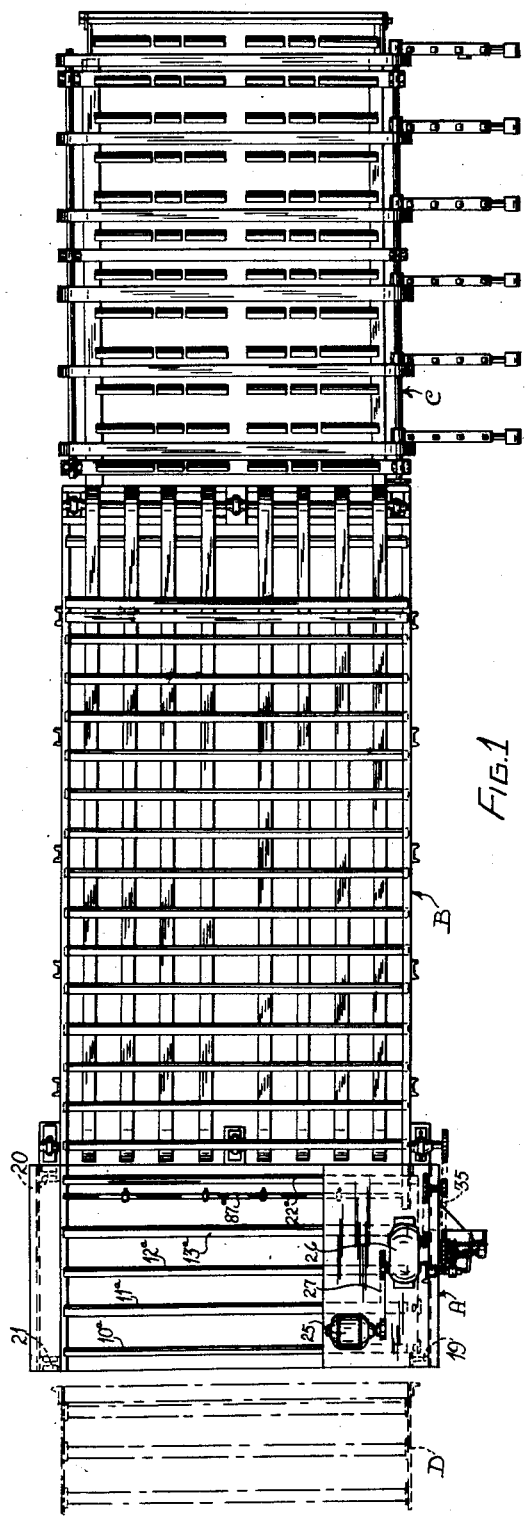
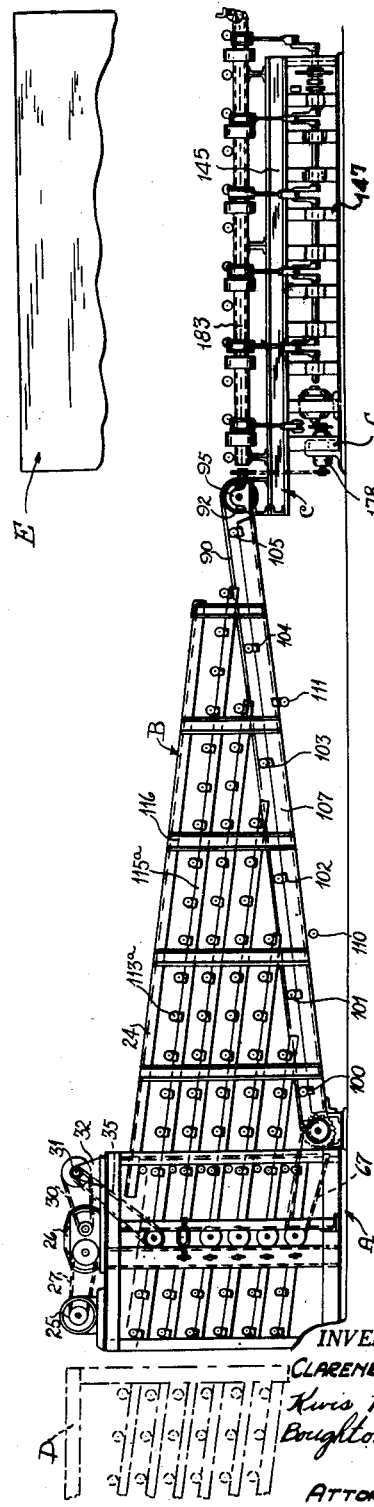
INVENTOR.
CLARENCE E. PARKER

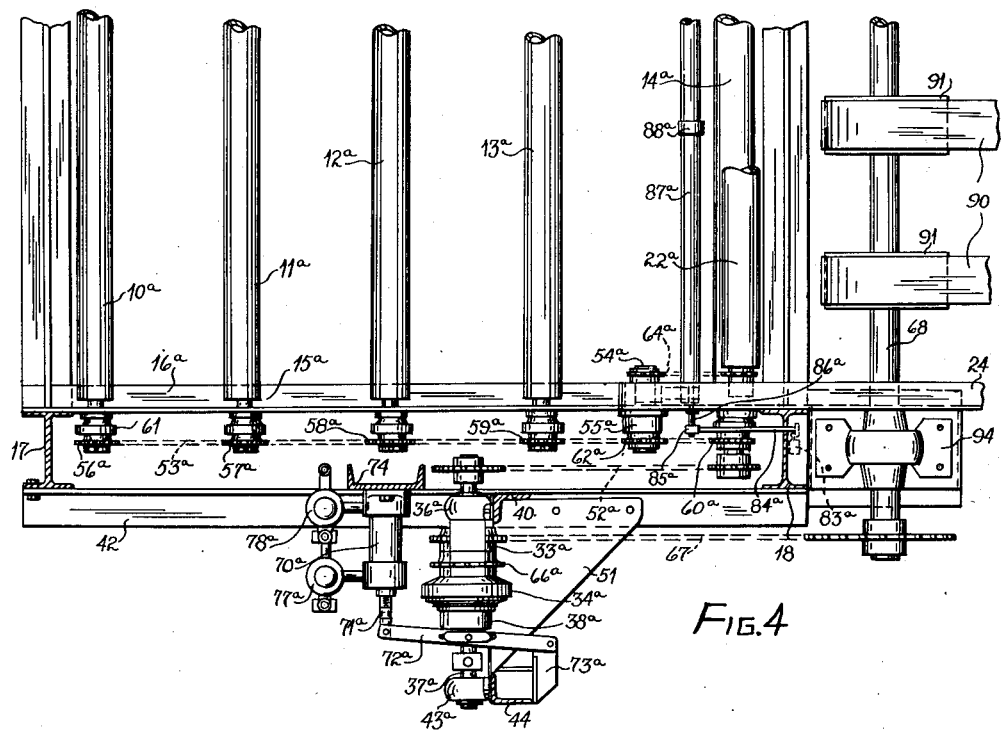

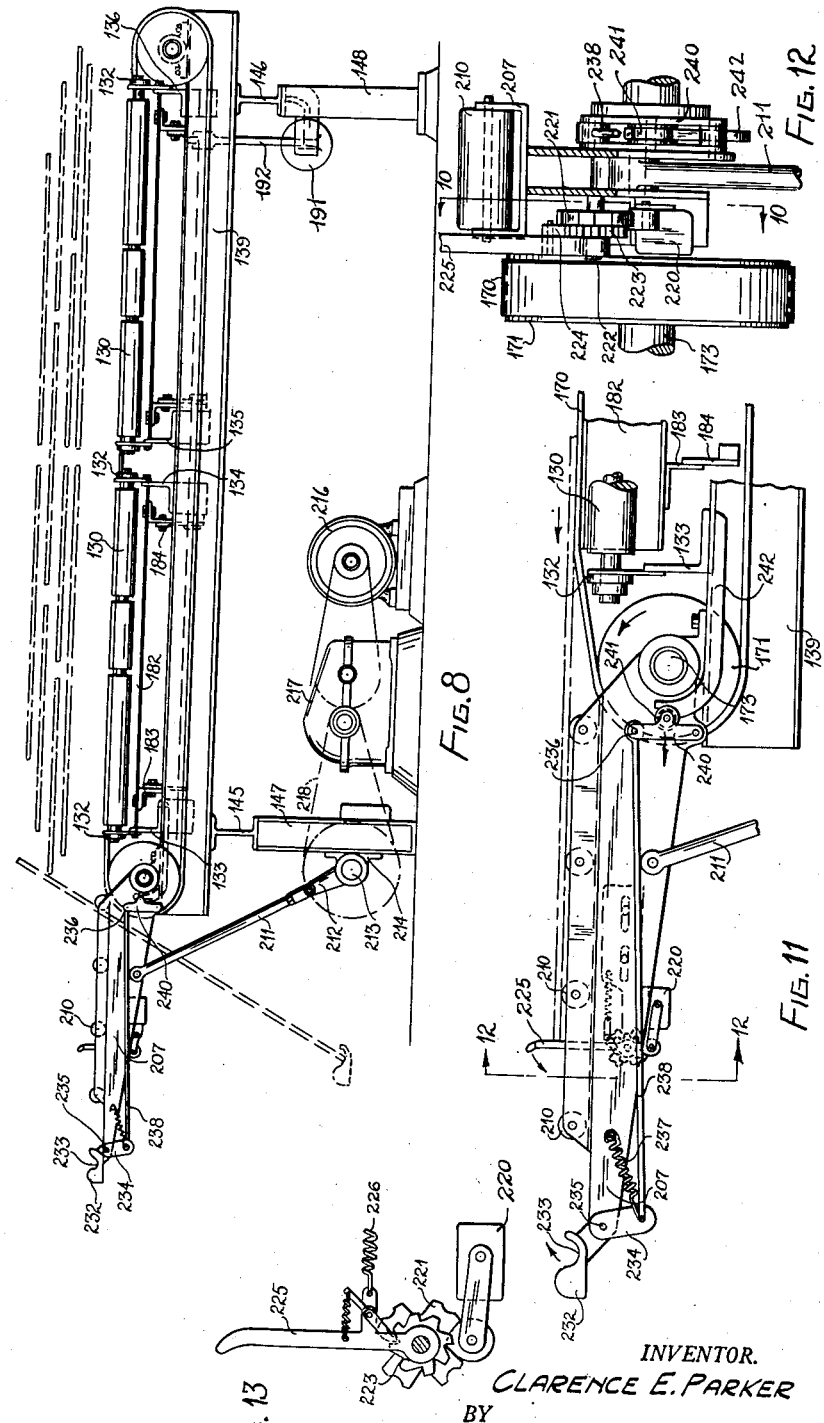

Patented Jan. 8, 1952

2,581,598

UNITED STATES PATENT OFFICE 2,581,598

SHEET HANDLING APPARATUS

Clarence E. Parker, Painesville, Ohio, assignor to The Coe Manufacturing Company, Painesville, Ohio, a corporation of Ohio Application December 1, 1944, Serial No. 566,060

5 Claims. (Cl. 198—33)

The present invention relates to apparatus for handling relatively large sheets of fairly rigid material, such as, plasterboards and the like.

Plasterboard is usually manufactured in long lengths on plasterboard machines and while still wet cut into smaller sizes, after which the sheets are fed into a multiple deck drier, etc., for further processing. During manufacture, one surface of the sheet is ordinarily finished more than the other surface and when the plasterboards are discharged from the drier or other apparatus, the finished surfaces are usually placed together prior to further handling so as to prevent the finished surfaces from becoming marred or dirty, etc.

Heretofore plasterboards were unloaded from the multiple deck driers or other apparatus by hand and when it was desired to place finished surfaces together, the unloaders or operators turned alternate boards as they unloaded the apparatus. This method of unloading multiple deck apparatus and/or placing finished surfaces together by hand involves considerable labor and is quite expensive, and the principal object of the present invention is the provision of a novel and improved automatic apparatus for unloading plasterboard or the like from a multiple deck drier or other multiple deck apparatus and delivering the same in a predetermined manner at a desired location, which apparatus may or may not include mechanism for turning alternate boards so as to place finished surfaces together.

Another object of the invention is the provision of a novel and improved apparatus for handling plasterboards or the like, which apparatus will receive plasterboards delivered thereto in a predetermined manner and automatically transfer the same to a desired location and turn alternate boards as they are transferred from one place to another.

The invention resides in certain constructions and combinations and arrangements of parts and further objects and advantages of the invention will be apparent to those skilled in the art to which the invention relates from the following description of the preferred embodiment described with reference to the accompanying drawings forming a part of this specification, and in which Fig. 1 is a plan view of plasterboard handling or unloading apparatus embodying the present invention;

Fig. 2 is a side elevational view of the apparatus shown in Fig. 1;

Fig. 4 is a sectional view approximately on the line 4—4 of Fig. 3, with portions broken away for clearness;

Fig. 5 is a fragmentary view of a portion of the apparatus shown in Fig. 4;

Fig. 8 is an end view of the apparatus shown in Figs. 6 and 7;

Fig. 9 is an enlarged view of a portion of Fig. 6;

Fig. 10 is an enlarged view of a portion of Fig. 7;

Fig. 11 is an enlarged view of a portion of Fig. 8;

Fig. 12 is a sectional view approximately on the line 12—12, Fig. 11;

Fig. 13 is a fragmentary view of part of the mechanism shown in Figs. 11 and 12.

Figure 3:
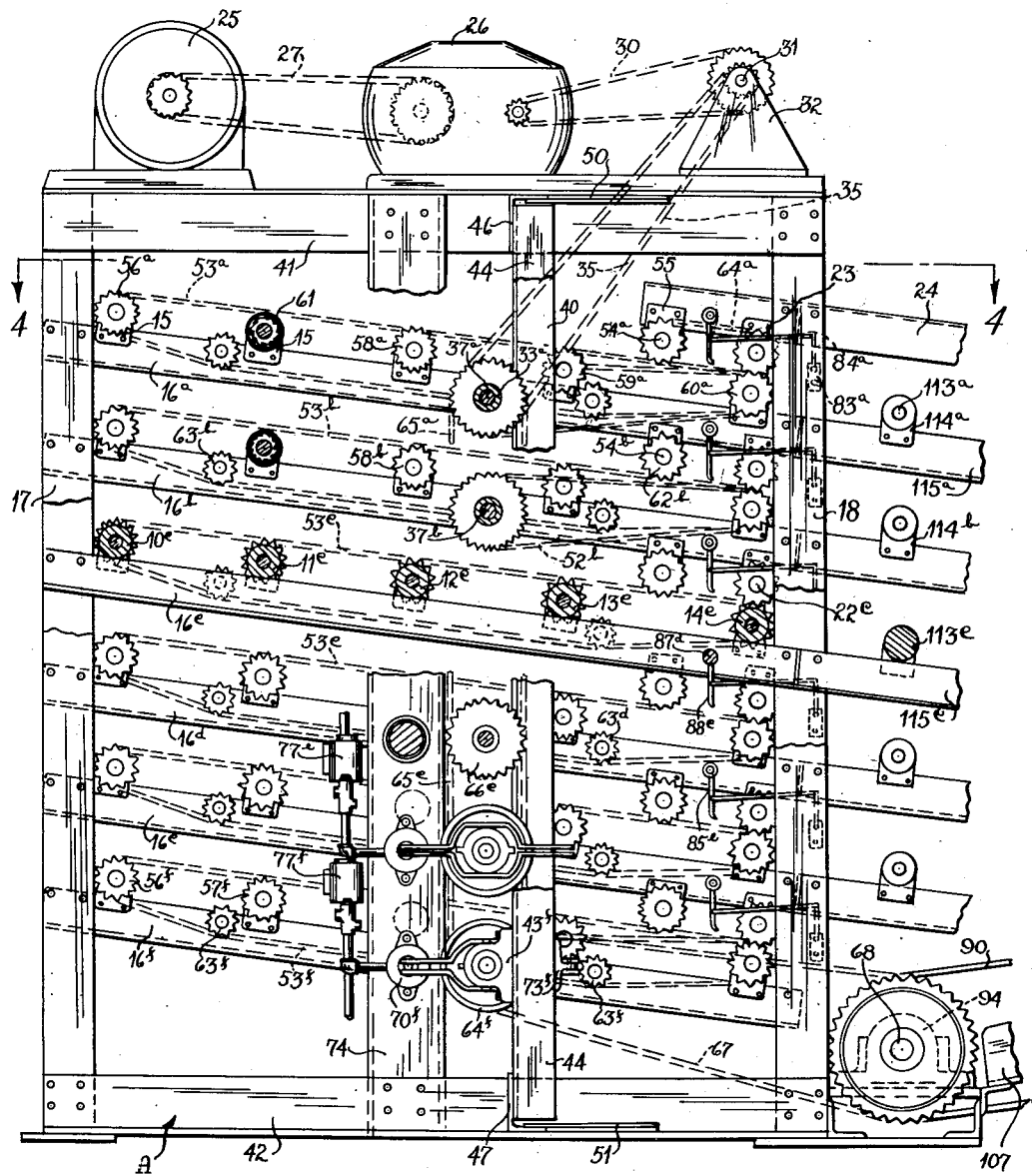
Fig. 3 is an enlarged side view of the drive section of the apparatus shown in Fig. 1, with portions broken away or omitted for clearness.

Although the present invention is applicable to the manufacture of various articles, it is especially useful in the manufacture of plasterboard and is herein shown as embodied in an apparatus for unloading multiple deck equipment used in manufacturing plasterboard and, more specifically, in apparatus for unloading a multiple deck plasterboard drier.

Generally speaking, the apparatus shown comprises unloading apparatus consisting of the drive section A and the conveying section B adapted to receive plasterboard from a multiple deck apparatus and deliver it in sequence to transfer apparatus comprising a combination discharge table and transfer section C adapted to receive plasterboard delivered thereto by the unloading apparatus and transfer the same to a desired location. In the embodiment shown, the boards are transferred to a taping machine where they are prepared for further handling. During their transfer to the taping machine, alternate boards are turned to bring the finished surfaces face to face. It is to be understood, however, that the invention contemplates that either the unloading apparatus or the transfer apparatus may be used separately or in combination with apparatus other than that shown, if desired.

While plasterboard may be manufactured in any suitable width or length, it is usually manufactured in 24", 30", 36", 42", and 48" widths and in lengths of 6', 8', 10' and 12'. Two or more plasterboards are usually caused to move simultaneously side by side through the various decks of the apparatus and this is the fact with regard to the apparatus shown. In the present instance the plasterboards are delivered to the drive section A of the unloading apparatus proper from a continuous drier, not shown, but which it is desired to unload, by a multiple deck gravity roll section D of conventional construction interposed between the drier and the drive section A. The drier is preferably loaded by a "tipple" loader, from which it follows that the boards enter the various decks of the drier and, in turn, the drive section in a predetermined order. For the purposes of the present disclosure, it will be assumed that the boards are traveling at about eight feet per minute as they enter the drive section and enter the various decks at about two foot intervals beginning with the top deck.

The drive section A comprises a plurality of decks, one for each of the decks of the drier and gravity roll section D. The decks of the drive section A and the conveying section B are, in effect, continuations of the decks of the gravity roll section D and are herein referred to as $a, b, c, d, e$ and $f$ commencing at the top of the machine. The decks are all duplicates and on the drawings the corresponding parts of the respective decks are indicated by the same reference character with the appropriate deck letter affixed thereto.

Each deck comprises five bottom rolls 10, 11, 12, 13 and 14, the opposite ends of which are rotatably supported by anti-friction bearings contained in brackets 15 bolted to the upstanding flanges of angle irons 16 located at opposite sides of the drive section and extending longitudinally of the path of movement of material through the same. The angle irons 16 constitute a part of the frame of the device and are connected at their opposite ends to corner posts in the form of I-beams 17, 18, 20, 21, which corner posts also are a part of the frame. In addition to the bottom rolls referred to, each deck comprises a top roll 22 rotatably supported by anti-friction bearings in bearing brackets 23 connected to the angle irons 16 of the deck immediately above. In the case of the top deck, the bearing brackets 23 for the top rolls 22 are connected to the left-hand end of the side top angle iron 24 of the frame of the conveying section B. The top roll 22 cooperates with the bottom roll 14 to form a set of pinch rolls.

The rolls of the respective decks are adapted to be intermittently driven from the electric motor 25, see Figs. 1 and 2, fixed to the top of the frame of the drive section and connected to a variable speed transmission 26 by a sprocket chain drive 27. The driving shaft of the variable speed transmission is connected by a sprocket chain drive 30 to a short shaft 31 rotatably supported in bearing brackets 32 fixed to the top of the frame of the drive section and which shaft is, in turn, connected to the driven element 33 of a friction clutch 34 by a sprocket chain drive 35. The driven member 33 of the friction clutch 34 is rotatably supported by a bearing 36 which prevents endwise movement thereof and a horizontal shaft 37, upon which shaft the other element 38 of the clutch is slidably keyed. The bearings 36 are connected to a vertically extending angle iron 40 bolted to the top and bottom longitudinal frame members 41 and 42. The outer ends of the shafts 37 are rotatably supported in bearing brackets 43 bolted or otherwise secured to a vertically extending angle iron 44 forming a part of the frame, the opposite ends of which angle iron are connected to the longitudinal frame members 41, 42 by transversely extending angle irons 46, 47 and triangularly-shaped plates 50, 51 located adjacent to the top and bottom of the frame, respectively.

The clutches 34 are actuated in a manner hereinafter specifically described to selectively rotate the shafts 37 and, in turn, drive the rolls of the respective decks. The shafts 37 are connected by sprocket chain drives 52 to the rolls 14 of the respective decks driven thereby. Each of the rolls 14 is, in turn, connected by a sprocket chain drive 53 to the rolls 10, 11, 12 and 13 and to a short shaft 54 rotatably supported in a bearing bracket 55 connected to the angle iron 16 of the deck immediately above. In the case of the top deck, the bearing bracket 55 is connected to the left-hand end of the angle iron 24 of the conveying section. The upper reaches of the sprocket chains of the drives 53 engage sprocket wheels 56, 57, 58, 59 and 60 connected to the rolls 10, 11, 12, 13 and 14, respectively, by one-way driving clutches, designated generally as 61, and which may be of any commercial design so long as they permit the rolls associated therewith to overrun in a clockwise direction, as viewed in Fig. 3. In addition to engaging the sprocket wheels 56 to 60, the upper reaches of the sprocket chains of the sprocket chain drives 53 mesh with sprocket wheels 62 fixed to the outer ends of the shafts 54 and the lower reaches of the chains pass about idler sprockets 63, rotatably supported by the angle irons 16 intermediate the sprockets 56, 57, and 59, 62, respectively. The top rolls 22 are driven from the shafts 54 by sprocket chain drives 64.

The driven members 33 of the clutches 34 are continuously connected to the driven member 33 of the clutch 34 of the deck immediately below by a sprocket chain drive 65, the driven sprocket 66 of which is fixed to and forms a part of the driven member 33 of the clutch for the deck above. The successive decks are driven by the drives 65 and the extra sprocket on the member 33 of the lower deck is connected by a sprocket chain drive 67 to a transversely extending shaft 68 of the conveying section.

Without further description, it will be apparent that when the motor 25 is operating, all of the driven elements of the friction clutches for the various decks and the shaft 68 of the conveying section B will be continuously driven and that the rollers of the various decks can be selectively rotated in a clockwise direction, as viewed in Figs. 2 and 3, by engaging the friction clutches selectively. As shown, the friction clutches 34 are adapted to be selectively engaged and disengaged by double-acting fluid pressure motors 70, the piston rods 71 of which are connected to the left-hand ends of levers 72 pivotally connected to members 73 welded to the vertical angle iron 44 of the frame of the machine. The fluid pressure motors 70 are carried by a vertical channel 74 connected to the longitudinal frame members 41, 42. The motors 70 are air-operated and the admission and exit of air to the opposite sides of the pitmans are controlled by pairs of solenoid-operated valves, of which there are two for each motor. The energization of the solenoids 77 and 78 of the valves 79, 80 of each motor are controlled by relays 81, the operating coils 82 of which are connected in series with normally open switches 83 fixed to the corner post 18, the operating arms of which switches are connected by links 84 to levers 85 fixed to rods 86 projecting from the ends of transversely extending shafts 87 and through the medium of which rods the front ends of the shafts 87 are pivotally supported in the angle irons 16 of the deck immediately above, or, in the case of the top deck, in the left-hand end of the angle iron 24 of the conveying section. The rear ends of the shafts 87 are supported in a similar manner. The shafts 87 are provided with a plurality of downwardly extending arms 88, the lower ends of which are adapted to project into the path of plasterboard moving through the deck immediately below.

As a plasterboard is delivered to one of the decks of the drive section from the gravity roll section D, it will coast down the rolls 10, 11, 12 and 13 until the front end engages the pinch rolls 14, 22, which pinch rolls are normally stationary at the time. Immediately prior to engaging the pinch rolls 14, 22, the front end of the plasterboard engages one of the arms 88 and rotates the shaft 87 to close the normally open contacts of the switch 83. Whether or not the friction clutch 34 of the particular deck referred to operates upon the closing of the normally open contacts of the switch 83, depends upon whether or not a plasterboard previously discharged from the drive section A has reached a predetermined position, as will be hereinafter more specifically pointed out. Assuming that the closing of the switch 83 connects the solenoids 77, 78 with a source of electric current, the fluid pressure motor 70 will be actuated to engage the friction clutch 34 and rotate the rolls of the deck in a direction to move the plasterboard forwardly and feed the same into the conveying section B. The speed at which the rolls of the drive section are driven is preferably such that the plasterboards are discharged from the drive section at a speed which is at least as many times greater than the speed at which they are delivered to the drive section as there are decks. This variation in speed permits the plasterboards which are fed to the various decks of the drive section more or less continuously to be delivered successively at a predetermined point and at predetermined intervals.

The conveying section B of the delivery apparatus comprises an endless belt or, more specifically, a plurality of endless belts 90 encircling pulleys 91 fixed to the shaft 68 located at the left-hand lower corner of the conveying section and similar pulleys 92 carried by a shaft 93 located at the opposite end of the conveying section. The shafts 68 and 93 are rotatably supported in suitable bearing brackets 94, 95, respectively, connected to opposite ends of the frame of the conveying section. The right-hand shaft 93 is raised above the level of the left-hand shaft 67, with the result that the upper reach of the belts 90 is inclined upwardly. The shaft 68 is driven in such a manner that the pulleys 91 carried thereby rotate in a clockwise direction, as viewed in Figs. 2 and 3, with the result that when a plasterboard is discharged upon the belts 90, it moves in an upward direction and towards the right.

In the embodiment shown, the right-hand end of the frame of the conveying section is supported upon the left-hand end of the combination discharge table and transfer section C. It is to be understood, however, that other means may be provided for supporting the right-hand end of the conveying section and that the belts 90 may discharge the plasterboards on any suitable device other than the discharge table shown and hereinafter specifically described, such as, a different type of discharge table, or, another conveyor, etc. The upper reaches of the belts 90 are supported by idler rolls 100, 101, 102, 103, 104 and 105 extending underneath the belts and rotatably supported by bearing brackets connected to the side bottom angle 107 of the frame of the conveying section. The lower reach of the belt is supported by idler rolls 110, 111 located underneath the belt and rotatably supported by bearing brackets connected to the side bottom angle iron 107.

The conveying section includes a plurality of decks formed by idle free running rolls 113, which decks extend between the decks of the drive section and the continuous conveyor formed by the endless belts 90. The decks of the conveying section are, in effect, continuations of the decks of the drive section and in view of the fact that the continuous conveyor formed by the belts 90 is inclined upwardly, the decks of the conveying section terminate at different points along the belts 90. In fact, the lower deck discharges directly upon the belts 90. The idle free running rolls 113 are rotatably supported by bearing brackets 114 connected to longitudinally extending angle irons 115 bolted or otherwise fixed to the vertical channels 116 of the frame of the conveying section, which channels are, in turn, connected to the upper and lower side angle irons 24 and 107, respectively.

As shown, the top roll 22a and the shaft 54a, etc., are connected to an extension of the top angle iron 24 of the conveying section and the front and rear angle irons 115 are connected to the corner posts 18, 20, respectively. To this extent the drive and conveying sections are formed integral and may be considered a single machine. It will be apparent, however, that the two sections may be formed entirely separate and driven by individual motors, in which event the conveying section is merely constructed so that it can be placed at the discharge end of the drive section with the respective decks of the drive and conveying sections aligning with each other.

As previously suggested, the rolls of the respective decks of the drive section are selectively driven, with the result that the plasterboards being handled are discharged in sequence from the drive section. This is accomplished by so constructing and interlocking the control circuits for the solenoids 77 and 78 of the respective decks, see wiring diagram, that when one of the switches 83 has been actuated and the solenoid associated therewith energized, a holding or maintaining circuit is established by the normally open bottom contacts of the relay 81 associated therewith which maintains the relay energized until the plasterboard discharged from the section reaches a predetermined position. As shown, the holding circuit is broken by the opening of a normally closed set of contacts of a time delay relay 121, the operating solenoid 122 of which is connected in series with a pair of series connected normally open switches 123, 124 carried by an angle iron 125 located at the right-hand end of the combination discharge table and transfer section C. The operating arms of the switches 123, 124 are extended to the left of the angle iron where they are adapted to be engaged by plasterboards reaching the end of the combination discharge table and transfer section, with the result that the holding circuit is maintained and the following deck of the drive section retained in the drive section until the plasterboards previously discharged reach the end of the table.

The various rolls of the drive and conveyor section shown are eight feet and eight inches long, from which it follows that the apparatus can handle in each deck simultaneously either two plasterboards 36" or 48" wide; three plasterboards 32" wide; or, four plasterboards 24" wide, see Fig. 8. Only two series connected switches 123, 124 are employed in the present instance because two switches have been found adequate regardless of the number of rows of plasterboards going through the machine. Obviously one or more switches may be employed, as desired. In the event that one or more of the boards stop short of the switches 123, 124, a manually operated switch 126 in parallel circuit therewith provides means for energizing the operating solenoid 122 of the time delay relay and, in turn, opening the normally closed contacts thereof. Alternatively, the time delay relay 121 which is used in the present instance for a purpose which will be hereinafter referred to may be omitted and a normally closed switch substituted for the contacts 120 of the time delay relay, which switch may be placed at any desired point in the path of the plasterboards, as at the end of the endless conveyor 90.

While it is to be understood that the unloading apparatus comprising the drive and conveying sections described above may be used with any type of discharge table or the like, the conveying section preferably discharges the plasterboards upon the combination discharge table and transfer section shown, which is especially designed to transfer the plasterboards to a taping machine and turn alternate boards. The combination discharge table and transfer section C shown comprises two horizontal rows of split rolls 130 onto which the plasterboards are discharged by the conveyor belts 90 and along which they coast until they engage the angle iron 125 or the operating levers for the switches 123, 124. The rolls 130 are split in the manner shown in the drawings so that they will better handle different size boards. Obviously any other suitable roll arrangement may be employed.

In operation, one or more of the boards upon the table C may be leading other boards thereon, in which event it is possible that all of the boards would not reach or substantially reach the right-hand end of the discharge table if the rolls were not split because the rolls engaged by the first board to reach the angle iron 125 would immediately stop rotating when the board stopped moving. With the split roll construction shown, the fact that one of the plasterboards is ahead of others will not ordinarily prevent the latter from continuing its forward movement after the first board has stopped because the probabilities are that the other board will be resting upon other rolls or other sections of the same roll.

The rolls 130 are rotatably supported by suitable bearing brackets 132 connected to the longitudinally extending angle irons 133 to 136, inclusive, supported upon the upper flanges of transversely extending I-beams 137, 138, 139 located adjacent to the center and opposite ends of the table and which I-beams are, in turn, supported on longitudinally extending front and rear I-beams 145, 146 carried by a plurality of legs 147, 148 located adjacent to the front and rear of the table, respectively.

The opposite ends of the angle iron 125, see Figs. 9 and 10, are connected to and carried by members 150 pivotally connected by pins 152 to the extended ends of the front and rear angle irons 133, 136. The member 150 at the front or operator's side of the machine is provided with a latch pin 153 which, when inserted in a suitable aperture in the member 150, holds the angle iron 125 in the position shown in full lines. When the latch pin 153 is removed, the members 150 and the angle iron 125 are free to rotate about the pins 152 until the members 150 engage stops 154 on the angle irons 133, 136. In this position, the angle iron 125 is below the horizontal plane of the top of the rolls 130 and the plasterboards delivered onto the table are allowed to discharge off the right-hand end of the device. The stop 154 on the near or operator's side of the machine is in the form of a normally closed switch, the operating lever of which is actuated to open the contacts thereof by the member 150 when moved to the position shown in dot-dash lines in Fig. 10. The purpose of the switch 154 will be hereinafter referred to.

As the plasterboards are discharged over the right-hand end of the device, the switches 123, 124 are actuated thereby to energize the relay 121 and break the holding circuit for the relay 81 so that a succeeding deck will be discharged. It will be noted that the actuating arms for the switches 123, 124 are only slightly below the horizontal plane of the upper surface of the rolls 130 and are, therefore, in a position to be engaged by the plasterboards as they tilt slightly when leaving the rolls.

With the angle iron 125 in the position shown in dot-dash lines in Fig. 10, the combination discharge and transfer section C thus far described is merely a discharge table upon which the plasterboards are automatically delivered in a predetermined sequence by the delivery apparatus comprising the drive section A and the conveying section B. As the plasterboards are discharged from the right-hand end of the table, they may be removed by hand or in any desired manner, as by suitable conveying mechanism or the like. Alternatively the material may be delivered to any suitable apparatus, such as, a one-deck lath or plasterboard breaker similar to the lath breaker disclosed and claimed in my issued Patent No. 2,311,995.

In addition to the transversely extending split rolls previously described, the combination discharge and transfer table comprises a plurality of transversely extending endless belts 170 encircling pulleys 171, 172 fixed to longitudinally extending shafts 173, 174 located at opposite sides of the table and rotatably supported by suitable bearing brackets 175, 176 connected to opposite ends of the transversely extending I-beams 137, 138 and 139. The shaft 173 is adapted to be intermittently rotated by an electric motor 177 located underneath the table and connected to a gear reduction 178 by a sprocket chain drive 180, which gear reduction is, in turn, connected to the shaft 173 by a sprocket chain drive 181. The center portions of the top reaches of the belts 170 are adapted to be periodically raised to transfer plasterboards resting upon the rollers 130 transversely of the table by a plurality of I-beams 182 extending longitudinally of the belts directly beneath the top reach thereof. The I-beams 182 are supported on longitudinally extending angle irons 183 connected to brackets 184, which brackets are, in turn, pivotally connected to horizontally extending arms of bell crank levers 185 keyed to transversely extending shafts 186 rotatably supported by bearing brackets 187 connected to the longitudinally extending I-beams 145, 146.

Both shafts 186 are connected together so that they rotate in the same direction and at the same time by rods 190 connected to the downwardly projecting arms of the bell crank levers 185. The shafts 186 and all of the bell crank levers are simultaneously rotated by a fluid pressure actuated motor 191 located underneath the table and connected to the longitudinal I-beam 146 by suitable brackets, the piston rod of which motor is connected to the left-hand shaft 186 by a lever 192. The construction is such that when pressure is admitted to the right-hand end of the fluid pressure motor 191, the shafts 186 are rotated in a clockwise direction to raise the longitudinally extending angle irons 183 and, in turn, the transversely extending I-beams 182 underneath the top reaches of the belts, thus raising the cross belts 170 and any boards resting upon the rolls 130 until the boards are free of the rolls.

The supply of fluid pressure to and from the motor 191 is controlled by a solenoid operated air valve, the solenoid 195 of which is connected in series circuit with normally open contacts of a relay 196, the operating solenoid 197 of which relay is connected in parallel circuit with the operating coil 122 of the time delay relay 121, from which it follows that simultaneously with the actuation of the time delay relay 121 to break the holding circuit for the relays 81 of the drive section A, the fluid pressure motor 191 will be actuated to raise the cross belts. As the cross belts are raised, a holding circuit for the operating solenoid 197 of relay 196 is established by the closing of the normally open lower contacts of said relay, which circuit maintains the solenoid 197 energized even though one or both of the switches 123, 124 open as a result of the plasterboards being moved away from the same, or, as a result of the push button switch 126 being released.

The circuit to the motor 177 which drives the cross belts is established simultaneously with the energization of the solenoid 195 by the closing of the normally open intermediate contacts of relay 196, which contacts are connected in series circuit with the operating solenoid 202 of a motor controller 203 for the motor 177. The cross-belt motor 177 is stopped by the opening of the normally closed switch 205 adapted to be temporarily opened by a lug, not shown, connected to the sprocket chain of the sprocket chain drive 181 for the cross belts. The construction is such that the movement of the cross belts is automatically stopped when they have moved a sufficient distance to transfer the plasterboards from above the rolls 130 of the discharge table to the pivoted arms 207 projecting to the front or near side of the table, as viewed in Fig. 1. The motor 177 is provided with a spring-engaged solenoid released mechanical brake, the solenoid 208 of which is connected in series circuit with an auxiliary set of normally open contacts on the motor controller 203, which contacts are closed simultaneously with the closing of the main contacts of the motor controller so as to release the brake while the motor is operating.

The upper surface of the arms 207, of which there are six in the embodiment shown, are provided with a plurality of free running rolls 210 over which the plasterboards coast or can be readily moved by an operator to some suitable receiving apparatus, such as the tape machine E, where the edges of successive pairs of boards are taped together. In view of the fact that it is desirable to turn alternate boards so that finished surfaces will be in contact with each other, provision is made for dropping and again raising the arms 207 as alternate boards pass thereover. For this purpose, the rear ends of the arms 207 are pivotally connected to the longitudinally extending shaft 173 and each arm is connected intermediate its ends by a pitman 211 to an eccentric or crank 212 on a longitudinally extending crankshaft 213 rotatably supported in suitable bearing boxes 214 connected to the front legs 147 of the table proper. The crankshaft 213 is adapted to be periodically rotated one revolution by an electric motor 216 located underneath the table proper and operatively connected to the crankshaft 213 through the medium of a gear reduction 217 and a sprocket chain drive 218.

The motor 216 is adapted to be started by the closing of a normally open electric switch 220 connected to the right-hand arm 207, the operating lever of which switch is actuated to close the circuit therethrough by a cam 221 on a short shaft 222 rotatably supported by one of the arms 207 and provided with a ratchet wheel 223 adapted to be periodically rotated by a pawl 224 pivotally connected to an upwardly extending arm 225, which arm is, in turn, pivotally connected to the shaft 222. The upper end of the arm 225 projects into the path of movement of the plasterboard and is so constructed that it is rotated approximately 45° as each plasterboard moves thereover. The arm 225 is continuously urged to its normal upright position by a tension spring 226 connected thereto and to the arm 207. The cam 221 has four high points, from which it follows that with the construction shown, it rotates one-eighth of a revolution as each board moves onto the arms 207 and since the cam has four high points, the circuit through the switch 220 is closed as alternate boards move onto the arms. The switch 220 is in series circuit with the operating solenoid 227 for the motor controller 228 for the motor 216. After the switch 220 opens incident to the plasterboard being moved away from the same, the circuit to the operating solenoid 227 of the motor controller 228 is maintained closed until the crankshaft 213 makes a complete revolution by a normally open switch 230 connected to one of the legs 147 of the table and adapted to be maintained closed while the crankshaft 213 makes a complete revolution by a cam 231 on the crankshaft, the periphery of which cam engages the actuating arm of the switch 230.

The free end of each of the projecting arms 207 is provided with a member 232 having a transversely extending groove 233 in the upper side thereof, which member is fixed to a short lever 234 rotatably supported in the end of the arm by a pin 235. The lever 234 is continuously urged in a counterclockwise direction as viewed in Fig. 11, by a spring 237 connected to the lower end thereof and to the arm 207. Movement of the lever 234 in a counterclockwise direction under the action of the spring 237 is limited by a link 238 connected to the lower end of the lever and to the upper end of a lever 240 pivotally connected to the arm 207 adjacent the shaft 173.

The lever 240 normally assumes a substantially vertical position and its pivotal connections with the link 238 and the arm 207 are located above and below the horizontal plane of the shaft 173 whereas the pivotal connection of the link 238 with the arm 234 is approximately in said plane. The lever 240 is provided with a roller 241 connected thereto approximately midway between its ends, which roller is held in continuous engagement with a cam member 242 by the spring 237. The cam member 242 is connected to the underside of the angle iron 133 and the free end thereof which projects between the arm lever 240 and the shaft 173 is so shaped that upon initial movement of the arm 207 in a downward direction, the roller 241 rides up on a raised arcuately-shaped cam surface, with the result that the lever 234 is rotated in a clockwise direction to project the member 232 into the path of the plasterboard, thus causing the lower end of the plasterboard to engage within the groove 233. When the arms 207 are at their lowest position, the operator can easily swing the upper edge of the plasterboard forwardly and as the arms return to their horizontal positions, the board is delivered to the taping machine with its opposite side up.

Figure 6:
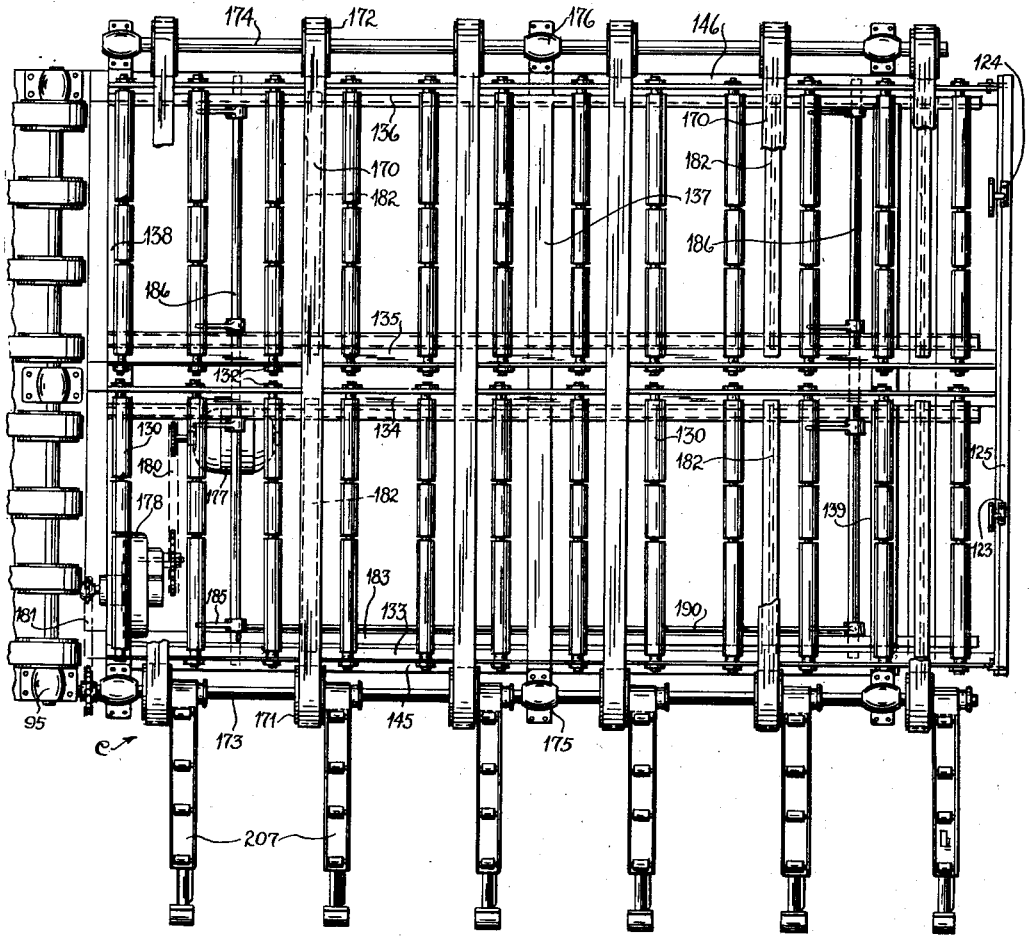
Fig. 6 is an enlarged plan view of the discharge table and transfer section of the apparatus shown in Figs. 1 and 2.
Figure 7:
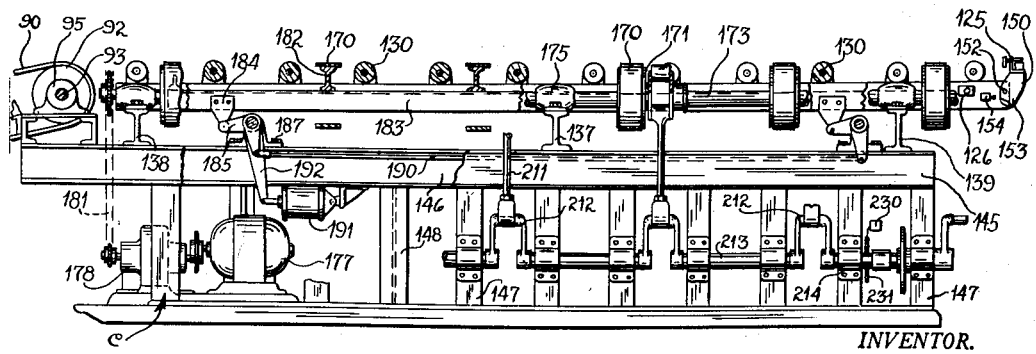
Fig. 7 is a side elevational view of the apparatus shown in Fig. 6, with portions broken away or omitted for clearness.
Figure 14:
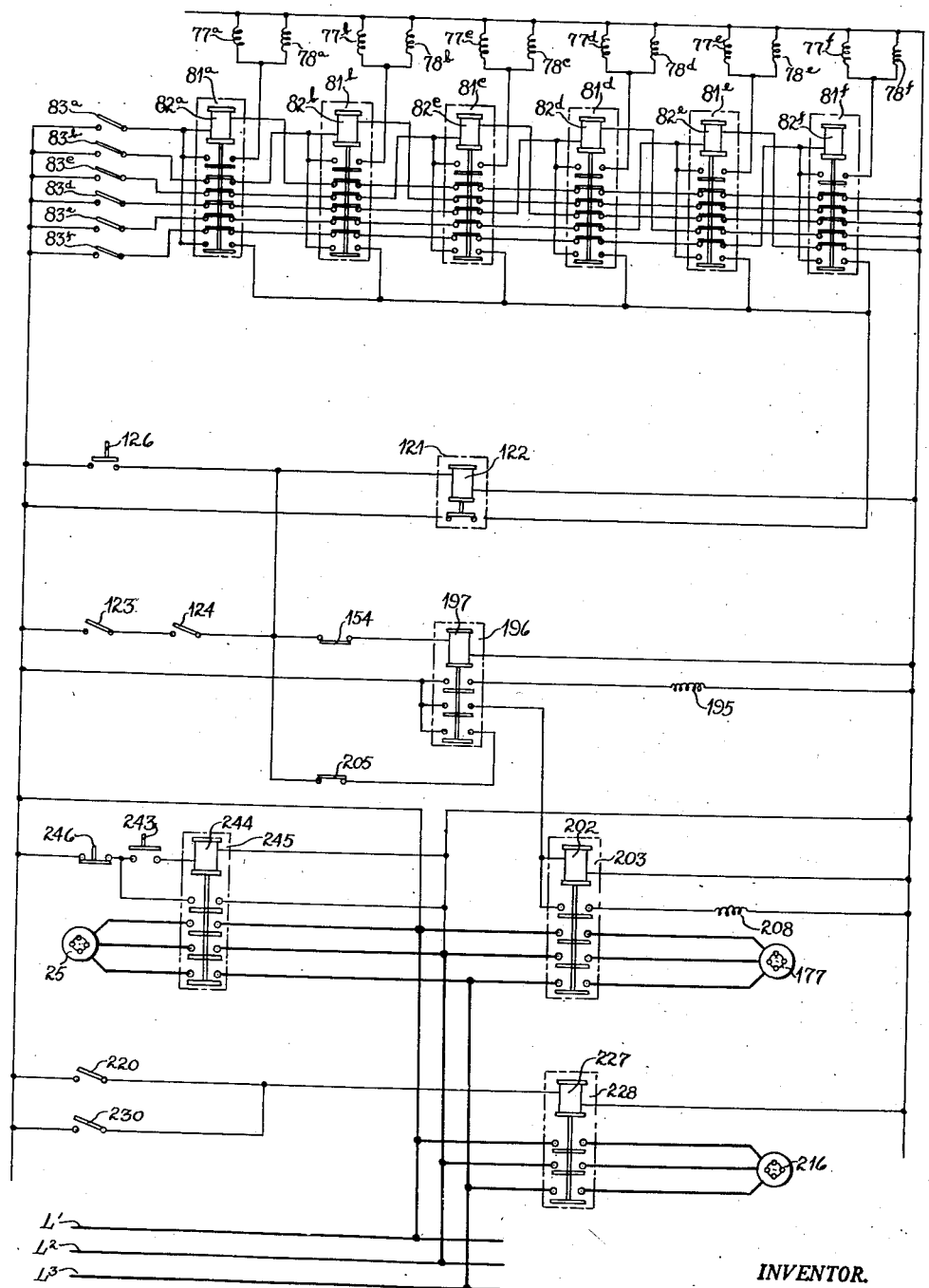
Fig. 14 is a wiring diagram of the electrical control circuits of the apparatus.

When short boards are being handled by the transfer apparatus, it is preferable to use only the arms 207 which are engaged thereby and to move the arms not being used to an inoperative position. In the machine shown, this is accomplished by disconnecting the pitmans 211 for the arms not being employed from their eccentrics 212. Accordingly, the bearing caps of the pitmans 211 for the three left-hand arms 207, as viewed in Figs. 6 and 7, are held in position by wing nuts so that they can be readily removed when desired. When the pitmans are disconnected from the eccentrics, the arms 207 associated therewith drop to a vertical position and are out of the way of the operators, etc.

As an alternative construction the arms 207 may be normally held in a horizontal position by spring means so adjusted that the weight of the plasterboards is sufficient to cause the arms to drop down as the boards move thereon. In this event the boards which are not to be turned are caught by hand and moved into the taping machine, etc.

The apparatus disclosed is especially designed for unloading a continuous drier into which the plasterboards are fed by a tipple loader. The boards enter the drive section A in a predetermined sequence, therefore, the switches 83 are actuated in sequence and the decks of the drive section unloaded one after the other. If the delivery apparatus is intended to be used with multiple deck apparatus wherein all or a plurality of the decks of the drive section are loaded simultaneously, a cam-operated cycle switch driven in timed relation to some suitable part of the machine, such as, the conveyor belts 90, may be employed in place of the switches 83.

*Summary of operation*

In describing the operation of the apparatus, it will be assumed that two rows of boards are traveling simultaneously through each deck of the drier and gravity roll section and it will be further assumed that the cycle of operations commences with the boards entering the top deck of the drive section, hereinbefore referred to as deck *a*. It is to be understood, however, that the cycle of operations may commence with any deck and progress either in an upward or downward direction. All of the electric motors employed are three-phase alternating current motors and the motor 25 is started by depressing the start push button switch 243 connected in series with the operating solenoid 244 of motor controller 245 across the power lines L-1, L-2. When the start push button switch is depressed, a circuit is established energizing the solenoid 244, closing the normally open main contacts of the motor controller, which contacts connect the motor 25 to the power lines L-1, L-2 and L-3. A holding circuit is established for the solenoid by the closing of a pair of auxiliary contacts simultaneously with the closing of the main contacts of the motor controller. A stop push button switch 246 connected in series circuit with the start push button switch 243 may be depressed at any time to stop the machine. As the first plasterboards to enter deck *a* approach the right-hand end of the drive section, the leading edge or edges thereof engage one or more of the arms 88a carried by the transversely extending shaft 87a to close the normally open switch 83a. When the switch 83a is closed, it energizes the operating solenoid 82a of relay 81a closing the normally open upper contacts thereof and energizing the operating solenoids 77a, 78a of the solenoid-operated valves 79a, 80a which control the fluid pressure motor 70a.

Simultaneously with the closing of the normally open contacts of relay 81a, previously referred to, a holding circuit is established which maintains the operating solenoid of the relay energized even though the switch 83a subsequently opens upon the boards in the deck *a* being discharged into the conveying section. Upon energization of the operating solenoids for the valves 79a, 80a, the direction of flow of fluid pressure to the motor 70a is reversed and the clutch 34a energized, whereupon the rolls of the deck *a* are driven to deliver the plasterboards therein to the conveying section B. At the same time that the operating solenoids 77a, 78a are energized to actuate the rolls of deck *a*, the switches 83b, 83c, 83d, 83e and 83f for the other decks are rendered inoperative by the opening of five normally closed contacts of relay 81a, which contacts are in series circuit with the switches 83b to 83f, inclusive. The fact that the switches 83b to 83f, inclusive, are rendered inoperative simultaneously with the driving of the rolls of the deck *a*, prevents a second board being discharged by the drive section A into the conveying section B until the holding circuit for the relay 81a is broken by the boards reaching the end of the discharge table formed by the rolls 130 and closing the normally open switches 123, 124.

When the boards are discharged from deck *a* of the drive section A into deck *a* of the conveying section B, they travel down the free running rolls 113a to the belts 90 which carry them to the rolls 130 of the discharge table, over which they coast to the end of the table and into engagement with the switches 123, 124. The rolls 130 are split so that in the event one board of the pair is trailing the other, its forward movement will not be stopped simultaneously with the forward movement of the leading board, thus permitting both boards to align themselves at the end of the discharge table and close both switches 123, 124.

When both switches 123, 124 are closed, a circuit is established energizing the operating solenoid 122 of a time delay relay 121, the normally closed contacts of which are in series circuit with the holding circuit for all of the relays 81a to 81f, inclusive. The actuation of the time delay relay 121 breaks the holding circuit for relay 81a, permitting the next deck to discharge into the conveying section. If for some reason both switches 123, 124 are not closed by the boards moving through the apparatus, the operating solenoid 122 of the time delay relay 121 can be energized by the manual control push button switch 126. The speed of the apparatus is preferably so adjusted by means of the variable speed transmission 26 that the pair of boards discharged from deck a actuate the switches 123, 124 as the leading edges of the pair of boards in deck b reach the arms 88b; in other words, the boards are shot out of the drive section, so to speak, at such a speed that they travel to the end of the discharge table while the boards in the drier, etc., are traveling a distance of approximately three-quarters of a foot. If the drive section A is timed or synchronized with the tipple loader in such a manner that the boards are discharged from the drive section at the same rate at which they are loaded into the drier by the tipple loader, it will be apparent that the apparatus will work smoothly and continuously.

Simultaneously with the energization of the time delay relay 121 which relay after an interval breaks the holding circuit for relay 81a to permit the delivery of a pair of boards in deck b of the drive section, the solenoid 197 of relay 196 is energized to close the normally open contacts thereof, the closing of which establishes a holding circuit for the relay and energizes the actuating solenoid 195 of the solenoid control valves for the air-operated hoist motor 191. The holding circuit formed by the lower set of contacts of the relay maintains the operating coil 197 energized after the switches 123, 124 open or after the push button switch 126 is released. The admission of air under pressure to the hoist motor 191 upon energization of the operating solenoid 195, actuates the motor 191 to raise the upper reaches of the belts 170 and lift the plasterboards off the rollers 130. Simultaneously the closing of the intermediate contacts of relay 196 energizes the operating solenoid 202 of motor controller 203 for the motor 177 which drives the belts 170 and releases the solenoid released brake attached to the motor by the energization of the solenoid 208 thereof.

The motor 177 continues to operate until the sprocket chain drive 181 makes a complete revolution, at which time a lug thereon actuates the switch 205 to break the holding circuit for the relay 196 deenergizing the motor controller 203, disconnecting the motor 177, and deenergizing the solenoid 208, allowing the brake for the motor to be applied. While the sprocket chain drive 181 is making its complete revolution, the belts 170 move a sufficient amount to transfer the boards from above the rolls 130 onto the arms 207. As the first board moves onto the arm 207, operators at opposite ends of the transfer table slide the same from the arms onto the taping machine. As the second board moves onto the arms 207, the leading edge thereof actuates the lever 225 to close the switch 220 and energize the operating solenoid 227 of the motor controller 228, the energization of which starts the motor 216. The motor 216 rotates the crankshaft 213 oscillating the arms 207, whereupon the second board is turned upside down as it is transferred to the taping machine. As the arms 207 reach their lowest position, the operator or operators swing the upper edge of the board towards the taping machine and help to guide the board as the arms return to their upper position. When the crankshaft 213 has made a complete revolution, the circuit to the solenoid 227 of the motor controller 228 is broken by the opening of a switch 230, the actuation of which switch is controlled by a cam 231 on the crankshaft 213.

Concurrently with the deenergization of the motor 177 which drives the belts 170 incident to the opening of switch 205 which opens the holding circuit for relay 196, the solenoid 208 is deenergized reversing the control valve for the hoist motor 191 and allowing the upper reaches of the belts 170 to return to their normal position. At about the same time, the second pair of boards is discharged from the drive section A into the conveying section B, which boards reach the discharge table after the belts 170 have returned to their normal position. The time interval between the closing of the normally open switches 123, 124 and the delivery of a second pair of boards into the conveying section is controlled by the time delay relay 121, the normally closed contacts of which do not open to break the holding circuit for the relay 81a until after a predetermined interval, which interval can be varied as desired.

The cycle of operations is the same with respect to all of the decks and will continue so long as the apparatus is in operation and receiving boards from the gravity roll section D. As previously stated, the plasterboards delivered to the discharge table may be discharged over the right-hand end thereof rather than by way of the arms 207, etc., by moving the angle iron 125 to the dot-dash line position shown in Fig. 10. In this event, the boards do not stop on the rolls 130 but continue their movement and as they pass over the end of the discharge table they actuate the switches 123, 124 to break the holding circuit for the relay 81a and permit a second pair of boards to be discharged from the drive section of the apparatus. When the switches 123, 124 are closed with the parts in the position shown in dot-dash lines in Fig. 10, the relay 196 is prevented from operating by the open switch 154 in series circuit with the operating solenoid 197 of the relay. The fact that the relay 196 remains inoperative prevents the hoist motor 191 and the motor 177 which drives the belts 170 from operating.

As previously stated, the delivery apparatus comprising the drive section A and the conveying section B, can be used with or without the combination discharge and transfer section C and, in like manner, the combination delivery and transfer section C can be used with other types of delivery apparatus. Broadly speaking, the delivery apparatus is a device for unloading a multiple deck apparatus and delivering the material handled at a predetermined location in a predetermined sequence, and the combination discharge and transfer section is an apparatus for receiving material delivered thereto in a predetermined sequence and transferring it to another position while turning alternate pieces of material.

From the foregoing description of the preferred embodiment of the invention, it will be apparent that the objects heretofore enumerated and others have been accomplished and that there has been provided on automatic delivery apparatus for unloading multiple deck devices and/or novel discharge and transfer mechanism which will turn alternate plasterboards as they are delivered to a predetermined location. While the preferred embodiment of the invention has been described with considerable detail, it is merely illustrative of the invention, and I do not wish to be limited to the particular construction shown which obviously may be varied in many respects within the scope of my invention, and it is my intention to hereby cover all adaptations, modifications and uses thereof which come within the practice of those skilled in the art to which the invention relates and within the spirit and scope of the appended claims.

Having thus described my invention, What I claim is:

1. In equipment for handling plasterboard and the like delivered thereto in predetermined relation, the combination of a conveyor, power means for actuating said conveyor, said means being controlled by the presence of material above said conveyor, a pivoted member adjacent to the discharge end of said conveyor and adapted to receive material delivered thereto by said conveyor, power means for oscillating said pivoted member, and means actuated by the presence of material on said member for actuating said last-named means as alternate articles only are delivered to said member.

2. In apparatus for handling plasterboard and the like delivered thereto in predetermined relation, the combination of an apparatus comprising a plurality of rolls adapted to receive material delivered thereto and transfer the same to a predetermined position, an endless belt conveyor adapted to raise material resting on said rolls free of the latter and move it in a direction at right angles to its path of movement on said rolls, means for actuating said conveyor, said means being controlled by material on said rolls reaching a predetermined location, a pivoted member adjacent to the discharge end of said conveyor and adapted to receive material delivered thereto by said conveyor, means for oscillating said pivoted member, and means actuated by the presence of material on said member for actuating said last-named means as alternate articles only are delivered to said member.

3. In equipment for handling plasterboard and the like delivered thereto in predetermined relation, the combination of a conveyor, power means for actuating said conveyor, said means being controlled by the presence of material above said conveyor, a movable member adjacent to the discharge end of said conveyor and adapted to receive material delivered thereto by said conveyor, power means for moving said movable member so as to turn or partially turn material thereon, and automatic means for actuating said last-named means as alternate articles only are delivered to said member.

4. In apparatus for handling plasterboard and the like delivered thereto in predetermined relation, the combination of an apparatus comprising a plurality of rolls adapted to receive material delivered thereto and transfer the same to a predetermined position, an endless belt conveyor adapted to raise material resting on said rolls free of the latter and move it in a direction at right angles to its path of movement on said rolls, power means for actuating said conveyor, said means being controlled by material on said rolls reaching a predetermined location, a movable member adjacent to the discharge end of said conveyor and adapted to receive material delivered thereto by said conveyor, power means for moving said movable member so as to turn or partially turn material thereon, and means for automatically actuating said last-named means as alternate articles only are delivered to said member.

5. In equipment for handling plasterboard and the like in unit sheet form delivered thereto in predetermined order, a conveyor adapted to handle or convey a plurality of sheets in tandem relationship, power means for actuating said conveyor, a movable member adjacent to said conveyor and power actuated to turn or partially turn a sheet delivered thereabove by said conveyor, and means for automatically actuating said member to turn or partially turn alternate sheets handled or conveyed by said conveyor.

CLARENCE E. PARKER.

REFERENCES CITED

The following references are of record in the file of this patent:

UNITED STATES PATENTS

| Number | Name | Date |
|---|---|---|
| 996,386 | Williams | June 27, 1911 |
| 1,246,138 | Mitchell | Nov. 13, 1917 |
| 1,695,115 | Lockhart | Dec. 11, 1928 |
| 1,809,456 | Streeter | June 9, 1931 |
| 1,860,679 | Lockhart et al. | May 31, 1932 |
| 1,929,204 | Jeffrey et al. | Oct. 3, 1933 |

FOREIGN PATENTS

| Number | Country | Date |
|---|---|---|
| 786,384 | France | June 8, 1935 |